June 20, 1967  H. T. STIRLING  3,326,669
RECLAMATION OF MATERIAL
Filed Feb. 11, 1965
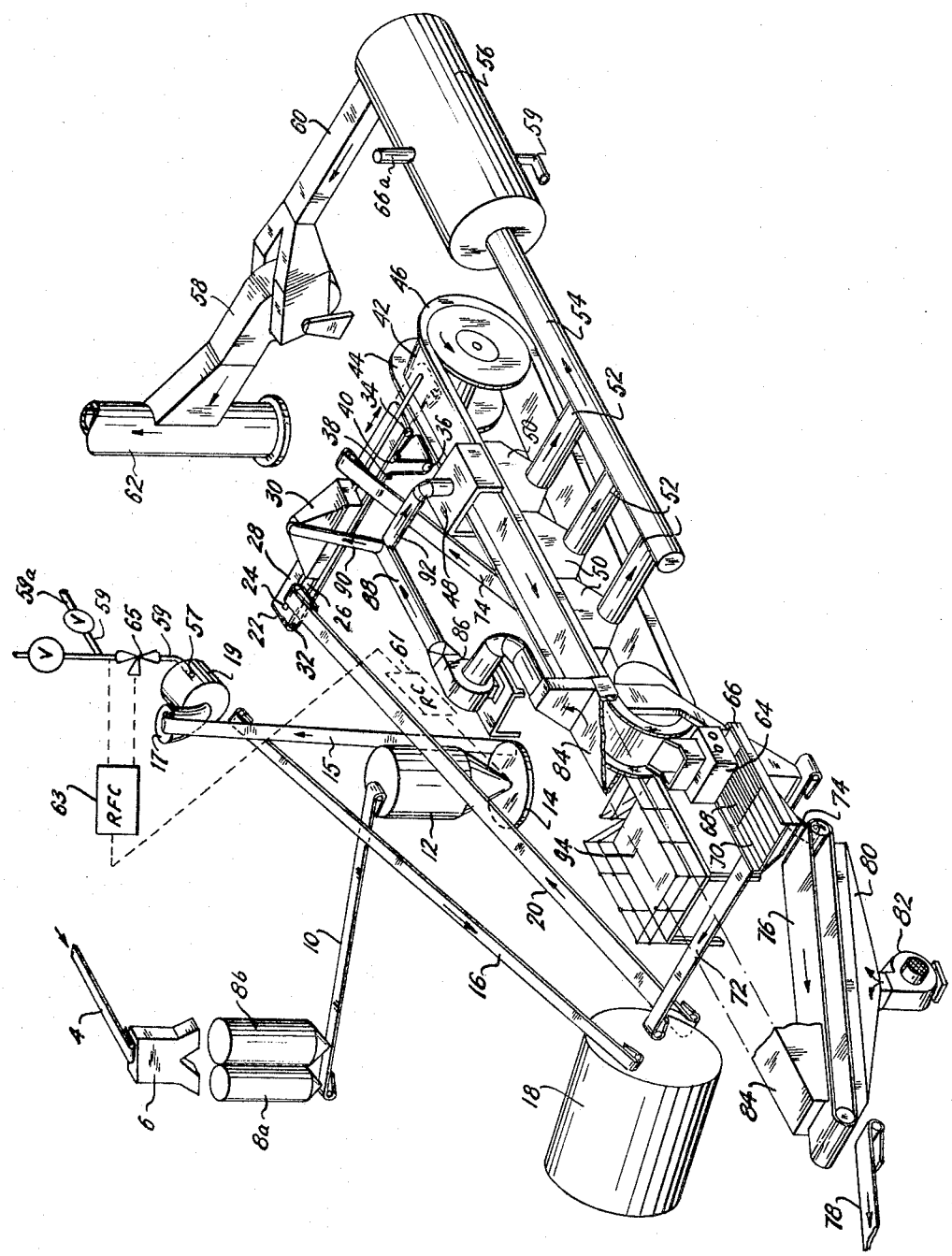
INVENTOR.
HAROLD T. STIRLING
BY Ronald S. Cornell
ATTORNEY

United States Patent Office 3,326,669
Patented June 20, 1967

3,326,669
RECLAMATION OF MATERIAL
Harold T. Stirling, Pittsburgh, Pa., assignor to Stirling Sintering Company, Pittsburgh, Pa., a corporation of Pennsylvania
Filed Feb. 11, 1965, Ser. No. 431,847
4 Claims. (Cl. 75—5)

This application is a continuation-in-part of my copending application Ser. No. 243,376, filed Dec. 10, 1962, now abandoned.

This invention relates to improvements in the production of valuable material by sintering or heat hardening pellets derived from fines such as fly ash or the dust obtained from the precipitators or dust collectors of any ferrous or non-ferrous metallurgical process.

During many industrial processes a substantial amount of fine material is obtained in the form of a fine dust-like material. Heretofore it has not been possible to utilize these fines and accordingly, since they could not be disposed of, the fines were stockpiled.

It has now been found that these costly, troublesome by-products can be converted into valuable and useful products. It is possible to convert into useful products such finely divided materials as ferro-manganese blast furnace flue dust, basic oxygen furnace dust, red-dog, phosphate rock fines, bauxite, chrome ore fines, iron ore fines, iron concentrate, certain ceramic fines, copper fines, high chrome and nickel fines, stainless steel grindings, iron sulfate, glass grinding fines, coal refuse, shale, clay, slag particles, fly ash, the iron concentrate from fly ash, the non-magnetic (tailings) fraction of fly ash, and many other particulate materials which at this time are being stockpiled at great cost to industry in the United States.

In accordance with the invention material from a storage bin is charged onto a suitable feeder such as a table feeder or a proportionating weigh belt type feeedr. The feeder meters the flow of feed material to conform to the required amount. A suitable recording computer is operatively associated with the feeder to record the quantity of feed material delivered.

From the feeder, the material is fed to a wetting drum where the particles are moistened to a predetermined moisture content. The amount of water added in the wetting drum is automatically controlled by a flow controller, known per se, which is responsive to a signal from the feed recorder. The use of a wetting drum increases the capacity of the plant in a manner described more fully hereinafter.

The wetted material is passed from the wetting drum to a pelletizing drum wherein the fines are transformed into agglomerates. The agglomerates are heated by passage through a heated hood, and then the feed conveyor deposits the pellets evenly on a sinter strand. The pellets on the sinter strand are subjected to intense heat in an ignition furnace, and the sintering operation is completed by drawing air through the sinter strand. The hot gases, after passage through the material being sintered and the strand itself, are passed through a dust collector to discharge.

The dust collector preferably operates on the principle of passing the gas to be cleaned through one or more cascading streams of water. The water from the dust collector is recycled to the wetting drum whereby the wet dust particles from the dust collector are formed with the initial feed material into pellets. This step accomplishes two results, namely the elimination of dust, and the recovery of the valuable contents present in the dust.

The sinter formed on the sinter strand is processed in a sizing roll crusher and deposited upon a vibrating hot screen or its equivalent and then cooled on suitable apparatus such as a wire mesh conveyor belt. The roll crusher or equivalent apparatus is preferably of an adjustable type which can be set at the desired maximum size for crushing the sinter cake before screening.

The vibrating hot screen advantageously contains two sections, a small screen section having a screen size equivalent to a predetermined bottom size which section may be for example one eighth or one quarter of an inch, and a large screen section for hearth layer which may have for example a screen size of about three-eighths inch. The large screen may be omitted if no hearth layer is to be used.

The material which passes through the large screen section and is retained on the small screen section of the vibrating hot screen is returned, for use as hearth layer on the sinter strand, by means of a special hearth layer belt made of silicone impregnated wire mesh. It is also possible to provide the hot screen with only the desired bottom size openings. In this event, the product with the hearth layer would discharge together into a hearth layer surge hopper where the overflow would go to product.

The plus three-eighths inch material from the vibrating screen is removed as product by means of a wire cloth cooler-conveyor belt. A hood is provided over the discharge end of the sinter strand, the sinter breaker, and the cooler-conveyor belt, and a suction is created in this hood by suitable means such as an exhaust fan. The fan forces cool air to flow up through the hot sinter product thus cooling the sinter. In addition, any dust from this area of the plant will be carried upwardly through the hood. The stream of hot, dust laden air is divided into at least two portions, one of which is passed to the heated hood of the feed conveyor, and the other to the ignition furnace. It may be desirable to use a third portion of the air to dry the pellets as they are formed in a manner discussed more fully in my copending application Serial No. 275,251 filed April 19, 1963 now abandoned.

The feeder conveyor is of novel reciprocating design formed from a wire mesh belt and preferably divided longitudinally into two sections. A first section is adapted to receive the hearth layer and a second downstream section receives the pelletized feed material. It is, of course, possible to use an undivided conveyor solely for the pelletized feed materials in which instance a hearth layer, if one is desired, can be fed by a hopper, or the like device, directly to the sinter strand.

The feeder conveyor is arranged in a direction normal to the direction of movement of the sinter strand and feeds across the width of the travelling pallets on the sinter strand. The hearth layer is placed on the sinter strand upstream of the material to be sintered and the material to be sintered is thereby deposited on top of the hearth layer.

The invention is illustrated with reference to the drawing which is an isometric view showing the apparatus of the invention.

In the illustrated embodiment of the invention, fine material such as the fly ash obtained from the precipitator of a steam generating plant is delivered from a source, not shown, by means of conveyor 4 to a treating means 6 which in the case of fly ash will advantageously be a magnetic separator. The fly ash is separated in means 6 into a magnetic fraction and a non-magnetic fraction, and these fractions are discharged into storage bins 8a and 8b.

A fraction of the fly ash is selectively deposited from bin 8a or b onto moving belt 10 which charges the material into feeder bin 12 of a suitable metering type feeder 14. A commercially available type of control means such as electric or pneumatic recorder controller 61 is provided to continuously record the quantity of material that is transferred by feeder means 14 to conveyor belt 15.

Conveyor 15 charges the dry, particulate feed material to a chute 17 which transports the feed to wetting drum 19. Water is added to wetting drum 19 through nozzle 57 of conduit 59. The amount of water added is controlled by means of rate of flow controller 63 which actuates valve 65 in conduit 59 in response to signals from recorder controller 61 to compensate for variations in the amount of feed material discharged onto conveyor 15. Advantageously, the recorder controller 61 or rate of flow controller 63 will be provided with a delay circuit to compensate for the length of time required for feed to traverse the distance between recorder controller 61 and the wetting drum 19.

The finely divided particles are moistened in wetting drum 19 to the proper predetermined moisture content for the particular feed material. This may vary between about 5 and 22 percent by weight. The wetting drum not only moistens the particles, but is also forms seed particles upon which the pelletizer can build pellets at a higher rate of speed. The prewetting also reduces dust pollution which previously has been a serious problem when charging finely divided material into a pelletizer.

Prewet material is conducted by conveyor 16 from wetting drum 19 to pelletizer 18 wherein the finely divided prewet material is transformed into agglomerates.

The agglomerates formed in pelletizer 18 are conveyed by belt conveyor 20 to feed conveyor 22. Feed conveyor 22 is advantageously divided longitudinally by means of plate 24 into two sections 26 and 28. The agglomerates are fed onto longitudinal section 26 of feed conveyor 22. These agglomerates are passed under a hood 30 at which point the agglomerates are subjected to hot gases at a temperature between about 200° F. and 1000° F. A windbox (not shown) is provided under the belt 22 to provide suction to draw hot gases through the belt from hood 30.

Feed belt 22 is a shuttle belt supported by rollers 32, 34. Roller 34 is comparatively connected to a shuttle, head-end pulley, not shown, whereby upon actuation of the shuttle, head-end pulley, the conveyor 22 is extended across the width of the sinter strand and then retracted to the position shown. Shuttle, head-end pulley advances roller 34 at a speed equal to or slightly greater than the forward speed of the upper strand of the conveyor. In this manner the material on the belt is not discharged on the forward thrust of the roller 34. Instead, the material on belt 22 is deposited on the sinter grate 42 upon retraction of the roller 34. This action is repeated in a continuous manner.

Roller 36, in conjunction with rollers 38, 40 is provided to take up the slack in feed conveyor 22 when the feed conveyor is in a retracted position. Since the feed conveyor 22 has its delivery end moving back and forth in a straight line transversely in respect to the sinter grate 42, the agglomerates of fine material are uniformly fed by the shuttle feed belt 22 and deposited in line back and forth across the sinter grate 42 as the latter moves. It will be understood that the back and forth motion of the delivery end of the shuttle feeder belt 22 is relatively more rapid than the rate of movement of the sinter grate 42 and the pattern of deposition has the effect of building up a level layer of uniform height directly under the shuttle belt 22 on the sinter grate 42. The agglomerates of finely divided material are thus fed uniformly onto the sinter grate 42. The sinter grate 42 is provided with side elements 44, 46 which retain the material on the belt.

The agglomerates on the belt are fed under ignition furnace 48 whereat the agglomerates are subjected to intense heat of between about 1850° and 2800° F. If the temperature is not maintained in this range, the pellets may not be properly sintered. Generally, a temperature of about 2500° F. is preferred for most materials.

Air is drawn downward through the layer of agglomerates, hearth layer, and the sinter grate 42 through wind boxes 50, duct work 52, 54 and dust collector 56 by means of a waste heat fan 58 operatively attached to the dust collector 56 by means of duct work 60. The intense heat formed in the ignition furnace 48 in conjunction with the air being passed through the sinter layer causes sintering or heat hardening of the agglomerates on the sinter strand 42. The resulting hot air passed through the wind boxes 50, duct work 52, 54, and the dust collector 56 is, by means of the waste heat fan 58, discharged through waste gas chimney 62.

When the agglomerated material has a high solid fuel content, the pellets which are formed will sinter together into a fused cake and then this sinter cake will be sized by crushing and screening as shown on the drawing. However, then the pelletized material does not contain the requisite amount of solid fuel (i.e. carbon), it will not ordinarily become fused together. Heating without the pellets becoming fused together is known as heat hardening. Heat hardened pellets do not lose their identity but remain individual spheres.

The sinter is removed from the end of sinter strand 42 and crushed in a sizing roll crusher 64 or its equivalent. The sizing roll crusher 64 is adjustable and can be set at the desired maximum size for processing the sinter cake before screening. The crushed sinter is then deposited upon a vibrating screen 66 which is comprised of two sections 68, 70.

Section 68 of hot vibrating screen 66 is a quarter inch screen (other desired bottom size screens can be used) through which pass any fines which are present. The fines passing through this quarter inch section 68 of screen 66 are recycled by suitable means, such as conveyor belt 72, to the pelletizer 18 for additional processing in the pelletizer. Section 70 of hot vibrating screen 66 is a ⅜-inch screen (or other size as desired for hearth layer) through which the plus ¼-inch-minus ⅜-inch material is passed. This intermediate size material is delivered to a conveyor belt 74. In some instances, the intermediate section can be eliminated and the hearth layer can be obtained from the product as it is fed onto the cooler. Conveyor belt 74 delivers the plus ¼-inch-minus ⅜-inch material to section 28 of feeder conveyor 22. This material or the material taken from the product before cooling is returned to the sinter strand 42 and is deposited as hearth layer on the sinter strand upstream of the agglomerates on section 26 of feeder conveyor 22.

The material which does not pass through either section 68 or 70 of screen 66 is plus ⅜-inch material. The plus ⅜-inch material is passed to conveyor belt 76 as product and from conveyor belt 76 is removed from the system by suitable means such as conveyor belt 78. The product on wire cloth conveyor belt 76 is cooled by a blast of cooling air passed through wind box 80 and conveyor belt 76 by means of a cooler fan 82.

A hood 84 is provided over the conveyor belt 76, the vibrating hot screen 66, and the discharge end of the sinter strand 42. An exhauster fan 86 provides suction within this hood 84. The suction created within hood 84 aids in drawing cooling air through the sinter. In addition, any dust from the crushing rolls 64 or the vibrating screen 66 will be carried upwardly through the hood. This hot, dust-laden air is then passed through duct work 88 and divided into two branches 90, 92. The hot air passing through duct work 90 is delivered to the preheater-dryer 30 and the hot air passing through duct work 92 feeds the ignition furnace 48. The duct work 88 is for convenience of illustration shown connected to hood 84 above the discharge end of strand 42; however, this connection is preferably located above crushing rolls 64. This also allows the strand 42 to return to the feed end without substantive cooling thereby diminishing the weakening effect of repetitive cooling and heating of the strand. This arrangement of recycled air provides for a good heat economy. As discussed above, a separate ignition fan could be used for better control of the ignition.

The plant is surprisingly dust-free. This is in part due to the combination of hoods used over certain parts of the plant which collect the air that might otherwise cause clouds of airborne finely divided particles. Thus, the normally dust-laden air from the discharge end of the sinter strand, the sinter breaker, and the wind boxes is circulated to the dust collector 56 in which the hot, dust-laden gases are cooled by a water spray. Fresh water is added to dust collector 56 through conduit 56a. After cooling, the gases pass through a rotating cylindrical packed ceramic member (not shown) the bottom portion of which is immersed in a water bath. The dust-laden air is broken into a large number of small streams which constantly are forced to change direction. In this manner, the dust particles are removed and the cleaned air progresses through conduit 60 and is discharged to the atmosphere through chimney 62.

The water from dust collector 56 containing collected material is advantageously circulated through conduit 59 to be used in the wetting drum 19 which is another important factor in keeping the plant dust-free. In this manner, the finely divided particles are recycled to the processing equipment thus increasing the final product yield. If necessary, makeup water can be added to conduit 59 through conduit 59a. In an alternate embodiment of my invention, the collected dust can be separated from the water and recycled to the pelletizer 18.

The entire plant is arranged so that control platform 94 can be located at both the discharge end of the sinter strand and the discharge end of the pelletizing drum so that both can be readily observed. With the control platform 94 at this location, it is possible to observe all of the vital points of operation from one position thereby enabling better control of the entire operation. By means of the location of the control platform 94, it is possible to readily operate all of the process variables such as the feed rate (control of table feeder 14); the pelletizer (the balling action can be carefully controlled to maintain optimum quality and size of pellets); windbox control (burn through can be continuously maintained on the last windbox); quality (increase or decrease or ignition temperature as required); and other variables such as dust control, fan speeds, etc.

The entire apparatus is of a semi-portable nature which enables relocation of the equipment after a stockpile of waste material has been depleted.

The operation of the apparatus of the invention is extremely flexible and versatile as illustrated by the examples described below.

EXAMPLE I

Precipitator dust from the precipitator of a ferro-manganese blast furnace was blended with downcomer dust from a ferro-manganese blast furnace. These materials had the analyses shown in Tables I and II below:

*Table I*

| Chemical analysis of precipitator dust: | Percent by weight |
|---|---|
| Iron | 7.40 |
| Phosphorus | 0.11 |
| Manganese | 15.87 |
| Sulfur | 1.64 |
| Silica | 8.59 |
| Alumina | 2.62 |
| CaO | 9.98 |
| MgO | 4.52 |
| Carbon | 6.78 |
| $Na_2O$ | 2.10 |
| $K_2O$ | 15.75 |
| $Li_2O$ | 0.15 |
| Miscellaneous | 1.16 |
| Intentionally added moisture | 23.33 |
| Total | 100.00 |

*Table II*

| Chemical analysis of downcomer dust: | Percent by weight |
|---|---|
| Iron | 9.91 |
| Phosphorus | 0.18 |
| Manganese | 37.50 |
| Sulfur | 3.20 |
| Silica | 10.36 |
| Alumina | 5.86 |
| CaO | 3.00 |
| MgO | 3.83 |
| Carbon | 19.53 |
| $Na_2O$ | 0.50 |
| $K_2O$ | 4.24 |
| $Li_2O$ | 0.04 |
| Miscellaneous | 1.85 |
| Total | 100.00 |

One thousand pounds of a blend of 50 percent precipitator dust and 50 percent downcomer dust was delivered directly to bin 8b since no pretreatment of the material was necessary. In some situations, however, it is desirable to leach unwanted salts from the ferro-manganese dust in which case a leaching tank or equivalent means would be used as means 6. The blend was continuously fed from bin 8b to feeder 14 and then by belt 15 to wetting drum 19 where a predetermined and automatically calculated amount of water was added. The wet material was transferred to pelletizer 18 wherein pellets were formed. The pellets were passed by means of conveyor belt 20 to section 26 of feed conveyor 22. These pellets were preheated to a temperature of about 400° F. and dried under hood 30 and were then deposited upon sinter strand 42.

After the initial pass hearth layer was formed and this hearth layer was returned by conveyor belt 74 and section 28 of feed belt 22 to the sinter strand 42, whereby the pellets being charged onto sinter strand 42 were deposited on top of the hearth layer. The pellets on sinter strand 42 were subjected to a temperature of about 2500° F. in ignition furnace 48. Air was drawn through the sinter strand and the pellets thereon to cause sintering of the agglomerates on the sinter strand. The air was then passed through dust collector 56 wherein the dust particles were removed. The water from the dust collector was recycled through conduit 59 to wetting drum 19. The sintered material passed from the sinter strand 42 to the sizing roll crusher 64.

Minus one-quarter inch material from the crusher 64 passed through screen 68 and was returned hot to the pelletizer at a position therein that it was subjected to only a few revolutions. The hot returns were thus combined with the material to be pelletized and then returned to the sinter strand. The plus one-quarter inch, minus three-eighth inch material was returned to section 28 of feed belt 22 to act as hearth layer on the sinter strand 42 and the plus three-eighth inch material was cooled on belt 76 and removed as product. Under ordinary circumstances, it was found that, on average, 2.5 tons per square foot of grate area of the blended material could be processed in a single day.

The above procedure produced hardened, sized sinter highly suitable for blast furnace use. The procedure described above remains generally true when using this equipment in the aforementioned process and works equally well with other fine materials such as fly ash from steam generating plants or pulverized coal. The following example illustrates the advantages of upgrading feed materials before processing. By performing the upgrading before sintering, the value of the end product is increased because of better quality, and, surprisingly, higher production will also result in many cases. Fly ash is typical of the improved product that can be obtained by work performed on the material before sintering, since, when material is finely divided, it is often quite easy to remove undesirable elements with a minimum of work or cost. If the feed material is not initially finely divided, it is sometimes advantageous, as with slag, for example, to mill the material so that it can be readily treated before sintering.

EXAMPLE II

Fly ash from a steam generating plant precipitator was processed in a manner similar to that described in Example I. The fly ash was, however, pretreated in treating device 6 to magnetically separate the feed material into two portions. The removal of high iron content material produced a better sinter product for lightweight material such as lightweight aggregate because it was lighter in weight and in color.

For the purpose of separating the magnetic and non-magnetic fractions treating device 6 comprised a magnetic separator with a high speed drum and a slower drum. By using a series of drums in tandem and varying their speeds, products of varying quality can be obtained.

Tables III and IV below show analyses of the iron laden fraction obtained by the magnetic separation pretreatment.

*Table III.—Physical analysis of iron-laden fly ash fraction*

| | |
|---|---|
| Specific gravity | 3.73 |
| Blains specific surface | 1461.0 |
| Loss on ignition percent | 0.3 |
| Tyler screen size mesh: | |
| +325 | 14.7 |
| −325 | 85.3 |

*Table IV.—Chemical analysis of iron-laden fly ash fraction*

| | Weight percent |
|---|---|
| $SiO_2$ | 15.37 |
| $Al_2O_3$ | 4.36 |
| $Fe_2O_3$ | 74.41 |
| CaO | 1.40 |
| MgO | 0.52 |
| $SO_3$ | 2.40 |
| $P_2O_5$ | 1.10 |
| $TiO_2$ | 0.12 |
| $Na_2O$ | 0.17 |
| $K_2O$ | 0.15 |
| Total | 100.00 |

If extremely high grade product is desirable, the iron laden fraction can be even further upgraded by additional magnetic treatments to an analysis of 90% or higher magnetic material and a specific gravity of about 4.0. When upgraded to this extent, the iron laden fraction is actually an iron concentrate of approximately 60% total iron.

The non-magnetic portion of the fly ash was wetted in wetting drum 19 to a moisture content of about 18% and then pelletized in pelletizer 18 with hot returns. The pelletized material was transported to conveyor 22 where it was predried and delivered to sinter strand 42. The pellets were heated under ignition furnace 48 to a temperature of about 2350° F. Air was drawn through windboxes 50 and the pellets were heat hardened. After crushing, screening, and cooling, the product pellets were found to be of high grade and useful as a lightweight aggregate.

The heavier portion of the separated material, which can be called the iron laden fraction, was separately processed by my invention into a heavier sintered product which is useful for many purposes such as blast furnace feed material, open hearth feed, basic oxygen furnace feed, etc. The iron laden fraction can, if desired, also be used in processes where fine iron powder is desired such as in washing plants, for thermowelding material, as additives to building materials, in powdered metallurgy, etc. However, the pricary use for the iron laden fraction is for steel-making after it has been upgraded by my process which changes the fine iron particles into high quality sized sinter or heat hardened sized pellets.

A further embodiment of my invention will be seen with reference to the following example which illustrates the usefulness of my process for the treatment of steel mill waste products.

EXAMPLE III

Slag scrap was processed in a manner similar to that described in Example I. The feed material was pretreated before processing by upgrading it in means 6 to increase the iron content thereof while decreasing the percentage of $SiO_2$ and other undesirable components. The iron content was raised to about 62% before processing was begun. The particles were wetted in the wetting drum to a moisture content of about 2% and then mixed in the pelletizer with hot returns. The feed was subsequently subjected to an ignition temperature of about 1900° F. for about five minutes. The low ignition temperature and relatively long ignition period was sufficient to begin an exothermic reaction. A large portion of the heat for fusion was thus obtained from the oxidation of the metallic and ferrous iron content of the slag. Generally, in order for this exothermic heat to be sufficient, the total iron content of the processed material should be at least about 50%.

The sintered material was passed from sinter strand 42 to sizing roll crusher 64 which was adjusted to form primarily plus two inch particles. The minus two inch material was further crushed and recycled to the processing equipment without cooling. The product particles were cooled and analyzed, and found to have a total iron content of about 72%. The product proved to be excellent feed for steel making processes.

The above invention has been described with reference to certain embodiments thereof. It will be obvious to those skilled in the art who read this specification that other variations and modifications of the invention can be made and various equivalents substituted therein without departing from the principles disclosed or going outside the scope of the specification or purview of the claims.

Having thus described the invention, I claim:

1. A process for the reclamation of finely divided material comprising the steps of wetting said material; pelletizing said wet material to form pellets; forming a bed of said pellets; drying said pellets; raising the temperature of said pellets to between about 1850 and 2800° F.; crushing the resulting material and screening said crushed material to form product and returns; cooling said product portion; recycling said returns to said process; passing air through said bed of pellets and through said resulting material as it is crushed and screened to remove the dust therefrom; passing the resulting dusty air through water; and passing the resulting dust laden water to said wetting step whereby said dust is recycled to the process and said water is used to wet the finely divided waste material.

2. A process for the reclamation of finely divided particulate material comprising the steps of wetting said particulate material; pelletizing said wet material to form pellets; forming a bed of said pellets; raising the temperature of said bed of pellets to between about 1850 and 2800° F.; passing air through said bed of pellets; scrubbing said air with water after said air has passed through the bed of pellets; and passing the resulting water to said wetting step to wet said waste material.

3. The process of claim 2 wherein said finely divided particulate material is the non-magnetic portion of fly ash.

4. The process of claim 1 wherein said finely divided material is an ore.

References Cited
UNITED STATES PATENTS

| | | | |
|---|---|---|---|
| 2,410,944 | 11/1946 | Johnson | 266—21 |
| 2,750,273 | 7/1953 | Lellep | 75—3 |
| 2,861,881 | 11/1958 | Phelps | 75—5 |
| 3,003,864 | 10/1961 | Kraner et al. | 75—5 |
| 3,043,677 | 7/1962 | Monagham | 75—5 |
| 3,131,244 | 4/1964 | Kuriyama | 266—21 |

BENJAMIN HENKIN, *Primary Examiner.*

UNITED STATES PATENT OFFICE
CERTIFICATE OF CORRECTION

Patent No. 3,326,669                      June 20, 1967

Harold T. Stirling

It is hereby certified that error appears in the above numbered patent requiring correction and that the said Letters Patent should read as corrected below.

Column 2, line 44, for "275,251 filed April 19, 1963 now abandoned." read -- 274,251 filed April 19, 1963 now Patent No. 3,210,772 issued October 5, 1965. --.

Signed and sealed this 29th day of April 1969.

(SEAL)
Attest:

Edward M. Fletcher, Jr.                     EDWARD J. BRENNER
Attesting Officer                          Commissioner of Patents